United States Patent [19]

Madsen

[11] Patent Number: 5,597,140

[45] Date of Patent: Jan. 28, 1997

[54] INFRARED DEICERS FOR AIRCRAFT POSITIONED ON A TAXIWAY AND METHODS FOR USING SAME

[76] Inventor: Robert C. Madsen, 6291 S. Westbridge St., Murray, Utah 84107

[21] Appl. No.: 372,066

[22] Filed: Jan. 12, 1995

Related U.S. Application Data

[63] Continuation-in-part of Ser. No. 106,299, Aug. 13, 1993.

[51] Int. Cl.⁶ .......................... B64D 15/00; B64D 15/12
[52] U.S. Cl. ............................ 244/134 R; 244/134 D; 219/121.66
[58] Field of Search .................. 244/134 R, 134 D; 219/121.65, 121.66, 202

[56] References Cited

U.S. PATENT DOCUMENTS

| | | | |
|---|---|---|---|
| 4,379,217 | 4/1983 | Youmans | 219/121 |
| 4,634,084 | 1/1987 | Magnusson | |
| 4,808,824 | 2/1989 | Sinnar | |
| 4,895,322 | 1/1990 | Zieve | |
| 4,900,891 | 2/1990 | Vega et al. | 219/121.65 |
| 4,942,078 | 7/1990 | Newman et al. | |
| 5,060,887 | 10/1991 | Kean | |
| 5,180,122 | 1/1993 | Christian et al. | 244/134 R |
| 5,318,254 | 6/1994 | Shaw et al. | 244/134 C |

FOREIGN PATENT DOCUMENTS

| | | |
|---|---|---|
| WO79/00331 | 6/1979 | WIPO . |
| WO93/09028 | 5/1993 | WIPO . |

OTHER PUBLICATIONS

Co-Ray Vac, Custom-Engineered, Low-Intensity Infrared Heating Systems, Roberts-Gordon Inc., Brochure.

*Primary Examiner*—Andres Kashnikow
*Assistant Examiner*—Virna Lissi Mojica
*Attorney, Agent, or Firm*—Workman, Nydegger & Seeley

[57] ABSTRACT

An apparatus for deicing an aircraft is defined by an insulated shelter being a size capable of enclosing an aircraft. The shelter is positioned on a deicing surface that absorbs heat from means such as electrical filaments or heated pipes within the deicing surface or through the application of infrared radiation onto the deicing surface. In turn, the deicing surface radiates heat into the air within the shelter. Once an aircraft is enclosed within the shelter, infrared radiation is applied to a portion of the exterior surface of the aircraft. The combination of the infrared radiation and the heat radiating from the deicing surface rapidly deices and substantially dries the exterior surface of the aircraft. The exterior of the aircraft is subsequently heated to a sufficiently high temperature that ice will not reform on the aircraft prior to take off.

21 Claims, 3 Drawing Sheets

5,597,140

INFRARED DEICERS FOR AIRCRAFT POSITIONED ON A TAXIWAY AND METHODS FOR USING SAME

RELATED APPLICATIONS

This application is a continuation-in-part of co-pending application Ser. No. 08/106,299, entitled "Infrared Deicers for Aircraft Positioned on a Taxiway and Methods for Using Same," filed Aug. 13, 1993 for Robert C. Madsen. Which is incorporated herein by specific reference.

BACKGROUND

1. Field of the Invention

The present invention relates to deicing of aircraft positioned on a taxiway just prior to takeoff. More particularly, the present invention is directed to the application of infrared radiation to an aircraft for rapidly deicing and substantially drying an aircraft immediately prior to takeoff.

2. Background Art

Federal Aviation Regulations (FAR) prohibit the takeoff of an aircraft when snow, ice, or frost is adhering to wings, propellers, control surfaces, engine inlets, or other critical surfaces of the aircraft. These regulations are a result of the detrimental influence that foreign matter on the exterior surface of an aircraft has on the control and safety of the aircraft during takeoff and flight.

Aircraft typically have a smooth exterior surface so as to produce a smooth or laminar air flow over the exterior or aerodynamic surfaces of the aircraft during takeoff and flight. A laminar air flow minimizes drag, maximizes lift, and optimizes control of the aircraft. The adhering of frozen contaminates, such as ice and dirt, to the exterior surface of an aircraft increases the surface roughness on the aerodynamic surfaces. Increased surface roughness alters the laminate flow of air to a turbulent flow which negatively affects drag, lift, and control on the aircraft.

Ice, snow, or frost often forms on the aircraft to a thickness and surface roughness similar to medium or coarse sandpaper. When so formed on the leading edge and/or upper surface of a wing it can reduce wing lift by as much as 30 percent and increase drag by 40 percent. These changes in lift and drag significantly increase stall speed, reduce controllability, and alter aircraft flight characteristics. In the winter when an aircraft is left outside overnight, ice can build up on the wings several inches thick. Thicker and/or rougher frozen contaminants can have a greater negative affect on lift, drag, stall speed, stability, and control.

These adverse effects on the aerodynamic properties of an aircraft may result in sudden deviation of the aircraft front its intended flight path. Such deviations may not be preceded by any indication or aerodynamic warning to the pilot. Accordingly, it is imperative that takeoff not be attempted until, as required by regulation, all critical surfaces of the aircraft are free of adhering ice, snow, or frost formations. Once the aircraft has taken off, the heated exhaust or bleed air from the engines can be circulated through ducts in the aircraft to warm the critical surfaces and prevent their reicing.

The required removal of frozen contaminants from an aircraft is referred to as the "clean aircraft concept." The common practice for obtaining a clean aircraft prior to takeoff has two steps. First, deicing is accomplished by applying heated aqueous solutions of Freezing Point Depressant (FPD) fluids to the surface of the aircraft. The theory of applying FPD fluids is to decrease the freezing point of water in its liquid or frozen state, thereby causing at least a portion of the ice to melt so that the ice slides off the aircraft. Second, if desired, anti-icing or the preventing of reicing is accomplished by applying SAE or ISO Type II fluids (hereinafter "anti-icing fluids") to the cleaned surface of the aircraft. Anti-icing fluids are effective anti-icers because of their high viscosity and pseudoplastic behavior. The anti-icing fluids are designed to remain on the wings of an aircraft during ground operations, thereby preventing the formation of ice on the surface of the aircraft.

Several different types of FPD fluids have been developed during the past 40 years and many are in common use today. Each of these various fluids has unique characteristics and handling requirements. The FPD fluids are applied to critical aircraft surfaces, i.e., wings, tail section, and fuselage, through conventional spraying mechanisms. If the ice persists, or recrystallizes on the aircraft, application of FPD fluid is repeated until a clean aircraft is obtained. Although this method of deicing is functional, there are numerous problems and drawbacks associated with it.

One of the problems associated with the use of FPD and anti-icing fluids is the delay resulting from refreezing. Deicing and anti-icing fluids are typically applied to the aircraft at the terminal prior to or shortly after loading of passengers. Although the fluids are helpful in preventing the reicing of aircraft, the combination of freezing weather conditions traditionally associated with the use of the fluids, the extended period of time between the application of the fluids and takeoff, and the gravitational runoff of the fluid coating often results in reicing of the aircraft as the aircraft waits on the taxiing runway in preparation for takeoff.

As a result of this reicing, the aircraft is often required to return to the terminal where the deicing fluid is again applied to the aircraft and the process begins again. This delay of a single aircraft, however, creates a chain reaction which not only delays surrounding aircraft but also connecting flights. This delay creates a burden for both passengers and scheduling.

The actual spraying of the deicing fluids can also be detrimental to the aircraft. Although the deicing fluids should be applied to critical surfaces of the aircraft relating to lift, it is important that the deicing fluids not pool in balance bays, control cavities, and gap fields or be directly sprayed into sensor orifices and probes along the fuselage of the aircraft. The application or pooling of the deicing fluids in such areas can result in a number of problems, including for example, inaccurate reading of aircraft instruments, freezing the movement of control surfaces, and fracturing of seals. Improper spraying can also damage protruding equipment from the aircraft such as antennas. Finally, due to their high viscosity, anti-icing fluids should not be applied to areas such as pitot heads, angle-of-attack sensors, control surface cavities, cockpit windows, nose of fuselage, lower side of randome underneath nose, static ports, air inlets, and engines. The application of anti-icing fluids to such areas can obscure the vision of the pilot and produce inaccurate readings of aircraft instruments.

Even if the deicing fluid is properly applied to the aircraft, there are negative side effects resulting from the deicing fluid adhering to the aircraft. Based on wind, temperature, and elevation conditions at a runway having a defined length, all aircraft have a critical weight which they cannot exceed for the given runway. If an aircraft exceeds the critical weight, it will be unable to obtain lift-off in the limited length of runway. This concept is referred to as the "balanced field." As the deicing fluid is applied to the aircraft, the weight of the aircraft increases. To compensate for this added weight, the aircraft is required to either limit its fuel, thereby limiting the duration it can remain aloft, or limit the number of passengers it takes, thereby decreasing its profit margin. Both of these choices negatively affect the airline industry.

Furthermore, as with the existence of ice, the existence of a deicing fluid on the exterior surface of the aircraft also reduces the lift and increases the drag on the aircraft. The reduction in lift requires the aircraft to further limit its weight in order to obtain lift-off. Although many aircraft are capable of reaching speeds during takeoff which substantially remove the deicing fluid from the aircraft, other smaller aircraft are not capable of reaching such speeds. Such aircraft are required to use lighter and less effective deicing fluids, thereby increasing the risk of reicing.

Deicing fluids can also be very expensive to apply, especially if the deicing fluid has to be applied more than once to prevent refreezing. Furthermore, deicing fluids are a potential health hazard to those who are exposed to the fluids. Commercially available FPD fluids used for aircraft deicing are ethylene, diethylene, and propylene glycol. Ethylene and diethylene glycol are moderately toxic to humans. Swallowing small amounts of ethylene and diethylene glycol may cause abdominal discomfort, pain, dizziness, and affects on the central nervous system and kidneys. Exposure to vapors or aerosols of any FPD fluid may cause transitory irritation of the eyes. Exposure to ethylene glycol vapor in a poorly ventilated area may cause nose and throat irritations, headaches, nausea, vomiting and dizziness.

Furthermore, all glycols cause some irritation upon contact with the eyes or the skin. Although the irritation is described as "negligible, " chemical manufacturers recommend avoiding skin contact with FPD fluids and wearing protective clothing when performing normal deicing operations. Accordingly, not only are traditional deicing fluids dangerous to those who apply them and work around them, they are also potentially hazardous to passengers who could be exposed to vapors from the deicing fluids.

Finally, in light of the hazardous nature of the deicing fluids and the vast quantities used during deicing, the deicing fluids are difficult to dispose of once applied to the aircraft. As the deicing fluid is applied to the aircraft, most of the fluid is deposited onto the ground with the melting ice. Recycling of the fluid is an expensive process since it must be gathered, purified and again concentrated before it can be used. Disposal of the fluid requires that it be gathered and properly deposited in a hazardous toxic waste landfill. This is also an expensive and hazardous process.

In an attempt to alleviate the problems associated with using FPD fluids, it has been proposed that infrared radiation be applied to portions of the exterior surface of the aircraft to melt the ice thereon, the aircraft being exposed to ambient conditions. Although this process proposes some advantages over the use of FPD fluids, as discussed in the section entitled Brief Summary and Objects of the Invention, there are numerous limitations encountered with solely using infrared radiation to deice an aircraft exposed to the environment.

BRIEF SUMMARY AND OBJECTS OF THE INVENTION

As discussed in the Background section, there are many problems associated with using conventional FPD fluids to deice aircraft. One attempt to resolve these problems has been to apply infrared radiation to portions of the exterior surface of the aircraft to melt the ice. In general, it has been proposed to attach infrared emitters to supports stationed on opposing sides of a taxiway leading to a runway. As the aircraft passes by the emitters, it is proposed that the ice will melt and fall from the aircraft.

Extensive research by the present inventor, however, has discovered that the singular application of infrared radiation to an aircraft does not solve all the problems. Aircraft most commonly need to be deiced during severe conditions. That is, it is generally most needed to have a clean aircraft when there are high winds, cold temperatures, and falling precipitation. This is especially important after an aircraft has sat all night and has a build up of ice on the exterior surface. It has been determined that under such conditions, where the aircraft is openly exposed to the elements, the application of infrared radiation to deice an aircraft is so slow or the required number of infrared heaters so large as to make the process unfeasible for the airline industry.

It has further been determined that even under conditions where the wind and precipitation is negligible but the temperature is below freezing, it is difficult if not impossible to completely deice and dry all portions of the exterior surface of an aircraft using exclusively infrared emitters. For example, directing infrared radiation to the top of a wing where frost and ice is most likely to accumulate can melt the ice. However, as the ice melts the resulting water runs to the bottom or edge of the wing where, out of the direct path of the infrared radiation, the water again freezes. Likewise, water from the melted ice can run into various control ports, tubes, components of the landing gear, or joints where the water freezes causing possible problems with navigation or mechanical operation of the aircraft. The same problems can occur with melting ice on the fuselage or other areas of the aircraft.

Although it is conceivable that infrared emitters can be configured so as to direct infrared radiation onto all exposed surfaces of an aircraft, to be functional, the infrared emitters must be capable of working on numerous types, sizes and shapes of aircraft. Such a configuration would be extremely complex and potentially dangerous. For example, in light of the fact that infrared radiation travels in a straight path, the infrared emitter would have to be placed on the front, back, top, bottom and sides of the aircraft. This would be a very complicated and costly procedure when attempting to deice a Boeing 747. Furthermore, there are still many ports and crevices which, due to their orientation, would not be capable or at least it would be very difficult to apply infrared radiation. Finally, positioning infrared emitters low the ground to deicing the underside of the aircraft can be potentially dangerous. To deice the aircraft in a reasonable time, it will be necessary in severe conditions to use high intensity emitters. Such emitters can be a potential hazard to crew members on the ground inspecting the aircraft to insure it is clean. Furthermore, having emitter located on the ground can be dangerous to possible fuel or oil leaks. likewise, ice falling from the aircraft and hit and damage the emitters. Although some type of screen could be placed over the emitter to alleviate some of the problems, the screen intern blocks the infrared radiation thereby decreasing their effectiveness.

To resolve the above discussed problems, and in accordance with the invention as embodied and broadly described herein, apparatus and methods for deicing an aircraft prior to takeoff are provided. In general, the apparatus comprises a shelter being a size capable of enclosing an aircraft. The shelter is defined by having walls, a roof, and an interior surface. Doors are positioned on opposing sides of the shelter to permit an aircraft to drive into the shelter through one door and leave the shelter through the opposing door. The shelter is preferably insulated and positioned on an approach area near the start of a runway.

A plurality of infrared emitters are attached to the interior surface of the shelter and are oriented so as to direct infrared radiation to a portion of the exterior surface of an aircraft positioned within the shelter. The infrared emitters are preferably quartz lamp infrared emitters which are capable of immediately heating an object and produce illumination. Of course other types of electric and gas infrared emitters can be used. The infrared emitters are primarily directed to the top surface of the aircraft where the majority of the ice or frozen matter accumulates.

The shelter is positioned on a deicing surface that acts in part as a floor for the shelter on which the aircraft is positioned. The deicing surface is preferably made of a material such as concrete or asphalt that can absorb, store, and slowly radiate heat. The deicing surface is heated by means such as infrared emitters which direct infrared radiation onto the deicing surface. Furthermore, electrical filaments or interconnected pipelines capable of carrying heated liquids can be positioned within or beneath the deicing surface so as to heat the deicing surface. Heat from the deicing surface is then transferred by convection within the shelter to heat the air within the shelter and all portions of the exterior surface of the aircraft.

The combination of the infrared radiation from the infrared emitters and the heat from the deicing surface is capable of rapidly deicing and substantially drying all portions of the exterior surface of an aircraft.

Furthermore, the exterior surface of the aircraft can be subsequently heated to a sufficient temperature to prevent refreezing of ice on the exterior surface of the aircraft prior to take-off. Furthermore, using the controlled environment of the shelter, a plurality of aircraft can consecutively be deiced and substantially dried, each aircraft taking less than about 15 minutes to deice and substantially dry once the aircraft is enclosed within the shelter.

Accordingly, it is an object of the present invention to provide methods and apparatus for rapidly deicing and substantially drying the exterior surface of an aircraft prior to takeoff.

Another object of the present invention is to accomplish deicing and to prevent reicing without using conventional FPD fluids.

It is another object of the present invention to provide methods and apparatus for avoiding the delay of aircraft as a result of re-icing of the aircraft as it prepares for takeoff.

Yet another object of the present invention is to provide methods and apparatus for deicing an aircraft that will not add extra weight to the aircraft.

Still another object of the present invention is to provide apparatus and methods for deicing an aircraft that will not inhibit the lift or add to the drag of the aircraft during takeoff.

Another object of the present invention is to provide apparatus and methods for deicing an aircraft so as to minimize the delay between deicing and takeoff.

Also, another object of the present invention is to provide methods and apparatus for deicing the aircraft that are relatively inexpensive.

It is yet another object of the present invention to provide methods and apparatus for deicing an aircraft that are not a health hazard to individuals.

Furthermore, an additional object to the present invention is to provide methods and apparatus for deicing an aircraft that will not contaminate the environment.

It is also an object of the present invention to provide methods and apparatus for deicing an aircraft that can be used by all aircraft regardless of their size or speed capability.

Another object of the present invention is to provide apparatus and methods for deicing an aircraft without the need for using infrared emitters below the aircraft where the infrared emitters could be potentially dangerous.

It is another object of the present invention to provide apparatus and methods for rapidly deicing aircraft in severe conditions.

Finally, it is another object of the present invention to provide apparatus and methods for rapidly deicing a plurality of aircraft either consecutively or in combination in severe conditions.

Additional objects and advantages of the invention will be set forth in a description which follows, and in part will be obvious from the description, or may be learned by the practice of the invention. The objects and advantages of the invention may be realized and obtained by means of the instruments and combinations particularly pointed out in the appended claims.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

Figure 1:
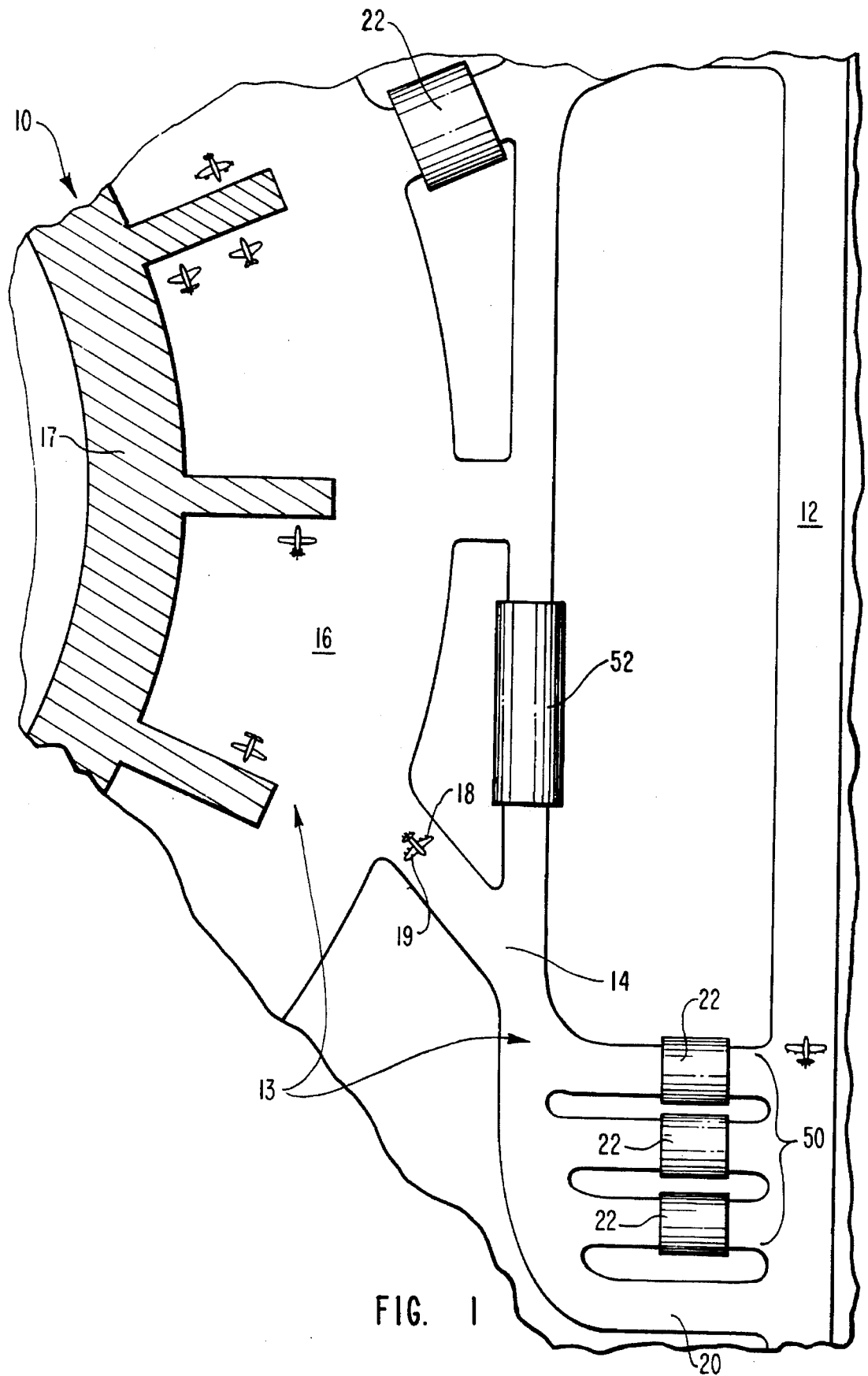
FIG. 1 is a top view of the layout of an airport including a runway, taxiway, loading area, and terminal.

Depicted in FIG. 1 is an embodiment of an airport 10 having a runway 12, an approach area 13, a taxiway 14, a loading area 16, and a terminal 17. Positioned on taxiway 14 is an aircraft 18 having an exterior surface 19. The term "exterior surface" as used in this specification and appended claims is intended to include all surfaces on aircraft 18 that are exposed to the outside environment when aircraft 18 is on the ground.

Figure 2:
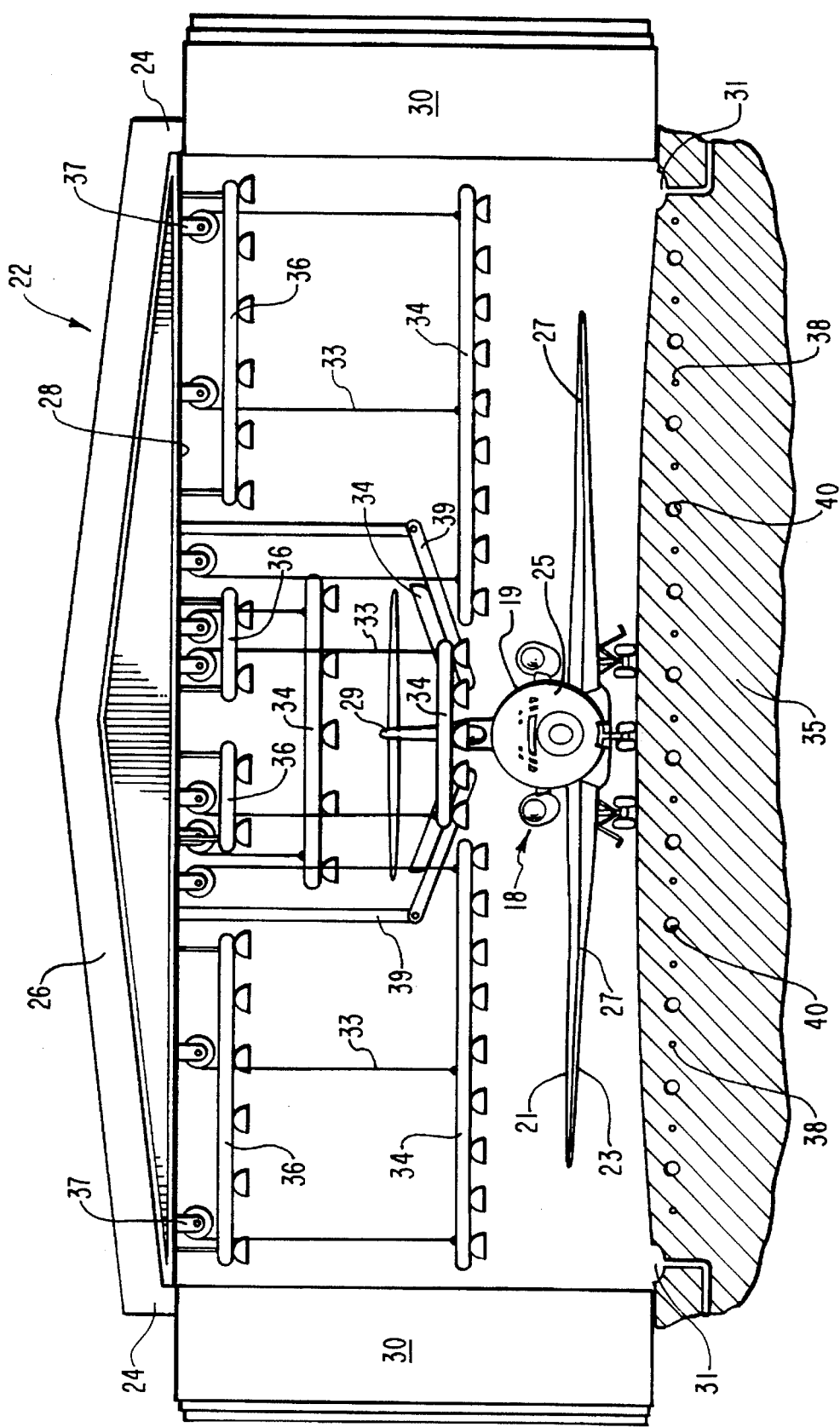
FIG. 2 is a side view of a deicing shelter enclosing an aircraft.

As depicted in FIG. 2, exterior surface 19 is divided generally into top surface 21 and a bottom surface 23. Top surface 21 is that area viewed from above aircraft 18, and bottom surface 23 is that area viewed from beneath aircraft 18. Aircraft 18 is further defined as having a fuselage 25, with wings 27 extending from opposing side of fuselage 25, and a tail 29 vertically extending from one end of fuselage 25.

The actual layout of airport 10 can vary dramatically depending on factors such as the location of the airport, the size of the aircraft serviced, the number of aircraft serviced, the destination of the aircraft (national or international), and, to some extent, the artistic creativity of the designer of the airport. Often, especially in large international airports, taxiway 14 can include a maze of interconnecting pathways leading to and from a variety of runways and waiting positions. Furthermore, the path that an aircraft travels on taxiway 14 can vary depending on the weather and which direction the aircraft are landing and taking off.

Accordingly, the term "taxiway" as used in this specification and appended claims is intended to include all possible pathways an aircraft is capable of traveling from loading area 16 to runway 12 in preparation for takeoff. Such pathways include all waiting positions of the aircraft and all alternate pathways leading to runway 12 which may currently exists or subsequently be created for implementation of the current invention. By way of example and not by limitation, an alternate pathway 20 is depicted in FIG. 1.

Furthermore, the term "loading area" as used in this specification and appended claims is intended to include those conventional areas in which aircraft are positioned during boarding and disembarking of passengers. Finally, the term "approach area" as used in the specification and appended claims is intended to include both loading area 16 and taxiway 14.

Figure 3:
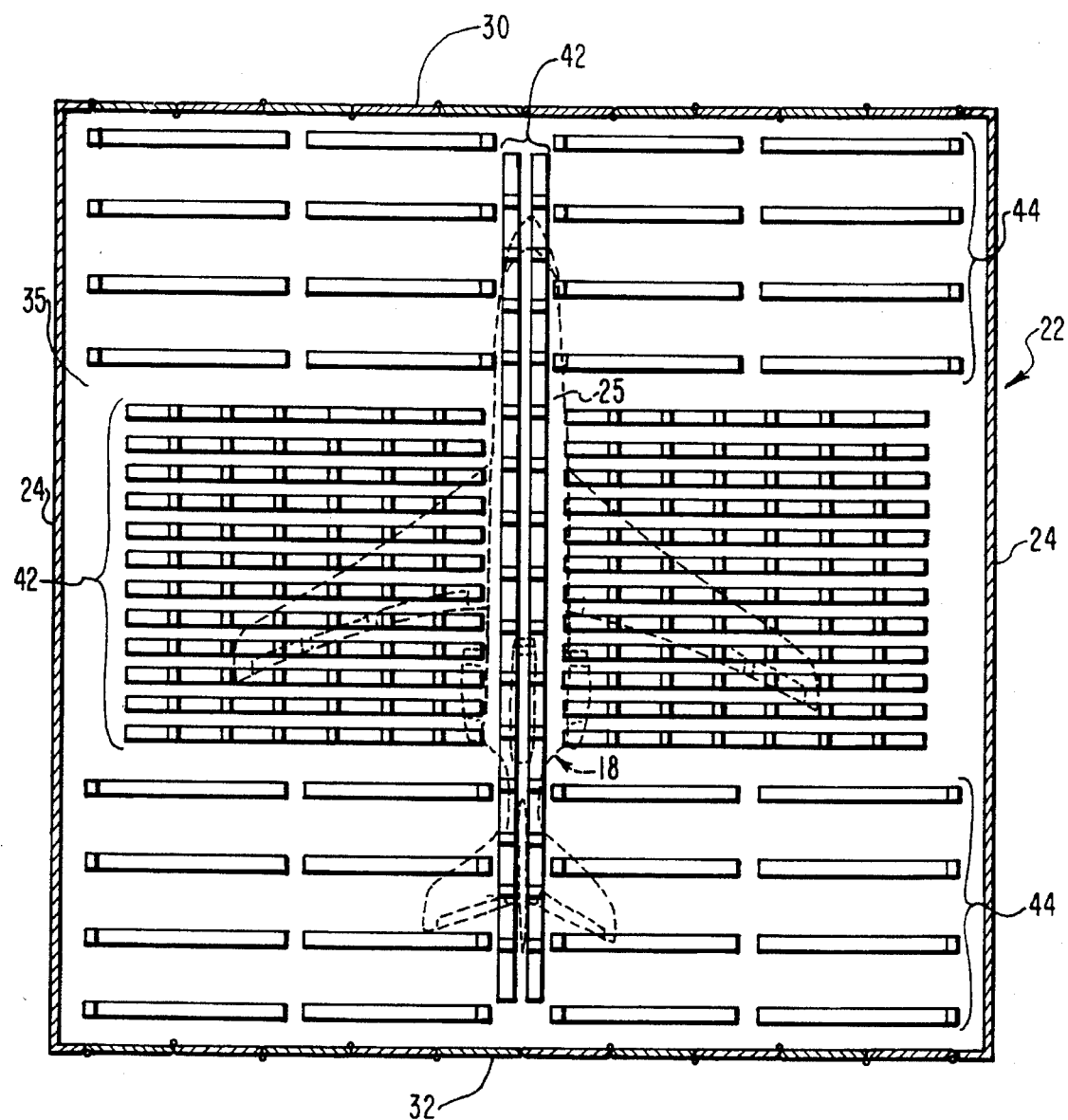
FIG. 3 is a top view of a shelter showing infrared emitters directed toward an aircraft and a deicing surface.

Depicted in FIG. 1 is a shelter 22. FIG. 2 is an enlarged side view of shelter 22 shown as having side walls 24, a roof 26, and an interior surface 28. As best seen in FIG. 3, positioned at opposing sides of shelter 22 are doors 30 and 32. FIGS. 2 and 3 show doors 30 and 32 as folding doors so as to conserve space. Alternatively, doors 30 and 32 could be slidable, hinged, or configured in any other conventional embodiment. Doors 30 and 32 are preferably electrically operated to selectively open and close. The exact size and configuration of shelter 22 and doors 30 and 32 are dependent on the type of aircraft to be deiced. For example, international airports that service large aircraft, such as the Boeing 747, will require a much larger shelter 22 than smaller airports where only propeller planes are able to land and takeoff.

Shelter 22 should, however, be sized so that aircraft 18 for deicing can be completely enclosed within shelter 22. In part, the purpose of shelter 22 is to seal aircraft 18 off from the affects of falling precipitation and blowing wind which can slow or even stop the deicing process. Furthermore, as will be discussed later in the discloser, shelter 22 is helpful in providing a controlled heated environment for rapidly deicing and drying aircraft 18.

To further assist in forming a controlled environment within shelter 22, it is preferred that side walls 24 and roof 26 of shelter 22 be insulated, preferably to an "R" factor in a range between about 10 to about 40 with about 20 to about 40 being preferred. Although, shelter 22 is depicted on taxiway 14, shelter 22 can be selectively positioned on any approach area 13.

In accordance with one aspect of the present invention means are provided for emitting infrared radiation on a portion of exterior surface 19 of aircraft 18 enclosed within shelter 22 to melt the ice on that portion of the exterior surface. By way of example and not by limitation, depicted in FIG. 2 is a plurality of primary infrared emitter 34 attached to interior surface 28 by cables 33. Primary infrared emitters 34 are selectively orientated so as to direct infrared radiation on a portion of exterior surface 14 of aircraft 18.

The infrared radiation is preferably directed toward top surface 21 and/or critical surfaces (as discussed later) where snow and ice most heavily accumulate.

The term "infrared radiation" as used in the specification and appended claims, is intended to include electromagnetic radiation or energy which is generated in a hot source, e.g., quartz lamp, quartz tube, or metal rod, by vibration and rotation of molecules. The resulting energy is controlled and directed specifically to and on people or objects. The energy is not absorbed by air and does not create heat until it is absorbed by an opaque object. Accordingly, infrared radiation heats an object directly, as opposed to conventional forced air heaters which heat the air surrounding an object. By heating the object directly, infrared emitters are capable of heating an object using minimal time, energy, and cost.

Electric infrared energy travels in straight lines from the heat source. This energy is directed into specific patterns by optically designed reflectors. Infrared, like light, travels outward from the heat source, and diffuses as a function of the square of the distance. Intensity, therefore, also decreases in a proportional manner. The term "infrared emitter" as used in the specification and appended claims is intended to include those apparatus that emit infrared radiation.

In the preferred embodiment, it is envisioned that infrared emitters 34 can be selectively raised, lowered, or angled so as to selectively adjust for different sized aircraft and to better adjust the angle at which the infrared radiation strikes aircraft 18. In one embodiment as depicted in FIG. 2, infrared emitters 34 are capable of being selectively raised and lowered by having cables 33 be electronically fed by electrical spools 37. Furthermore, mechanical arms 39 can be used for selectively positioning infrared emitters 34 at selective angles against tail 29 or other areas of aircraft 18.

It is also useful to be able to selectively raise and lower emitter 34 so as to compensate for the configuration aircraft 18 and to optimize positioning of infrared emitters 34. As previously discussed, infrared radiation dissipates as a function of distance, therefore to quickly deice aircraft 18, it is preferred to have infrared emitters 34 in a range between about 1 m to about 7 m with about 2 m to about 4 m being more preferred from exterior surface 19 of aircraft 18.

Tail 29 of aircraft 18 often rises more than 3 m above fuselage 25. Positioning infrared emitters 34 at a fixed location thus requires that infrared emitters 34 aligned along the length of fuselage 25 be positioned higher than tail 29 so that tail 29 does not strike infrared emitters 34 as aircraft 18 passes through shelter 22. In contrast, by having infrared emitters 34 that can selectively adjust in height, aircraft 18 can be pulled or driven into shelter 22 without interfering or hitting any infrared emitters 34. Infrared emitters 34 can then be selectively lowered along exterior surface 14 of aircraft 18 so that each infrared emitter 34 is the desired length away from aircraft 18. Once the aircraft has been deiced and dried, infrared emitters 34 can then be raised so that aircraft 18 can be removed from shelter 22.

The positioning of infrared emitters 34 can be implemented in a computer that automatically positions infrared emitters 34 based on the type and size of aircraft 18. Likewise, in less severe conditions, infrared emitters 34 can be controlled so that only selected infrared emitters 34 go on. Likewise, infrared emitters 34 can be selectively controlled so as to emit varied densities of infrared radiation.

There are a number of different types of infrared emitters that can be used for primary infrared emitters 34. In the preferred embodiment, quartz lamp infrared emitter are used. Alternatively, all other types of electric infrared emitters such as the quartz tube or metal sheath emitters can be used. Electric infrared emitters can be using between about 3 KW to about 15 KW with about 5 KW to about 9 KW being most preferred.

One preferred benefit of using electric quartz lamp infrared emitters is that quartz lamp emitters emit both infrared radiation and visible light for illumination. Thus, electric infrared emitters can be used for lighting within shelter 22 and for lighting exterior surface 19 of aircraft 18 to insure that exterior surface 19 is cleaned of ice.

Gas infrared emitters such as the high intensity or tube type emitters can also be used. Gas emitters can be installed which use between about 50,000 BTU/H to about 300,000 BTU/H. Any wavelength of infrared radiation can be used. It is preferred, however, to used infrared radiation in a range between about 0.7 microns to about 0.5 mm. The above discussed infrared emitters can be purchased from Infra-Red Products Supply Co. of Salt Lake City, Utah. The number and orientation of primary infrared emitters 34 will be discussed later.

As further depicted in FIG. 2, a deicing surface 35 is positioned within shelter 22 such that aircraft 18 rests thereon. Preferably, deicing surface 35 is interconnected with shelter 22 and is large enough to span between walls 24 of shelter 22, thereby serving the additional function of a floor. Deicing surface 35 should be strong enough to support aircraft 18 of a desired size thereon without failure. As will be discussed later, deicing surface 35 functions in part as a heat sink which radiates heat to the air within shelter 22 and onto aircraft 18 within shelter 22.

To best function as a heat sink, deicing surface 35 is preferably made of a material having a low specific heat and low thermal conductivity. That is, it is preferred to make deicing surface 35 out of a material that readily absorbs heat and can easily be heated to above or about room temperature. It is also preferred that the material radiates the absorbed heat slowly, continuously, and uniformly. Preferably, deicing surface 35 is made of asphalt, concrete, brick, or other masonry articles. It is envisioned that deicing surface 35 will be heated to a temperature in a range between about just above freezing to about 50° C. with about 15° C. to about 30° C. being more preferred.

As will be discussed later, where infrared radiation is used to heat deicing surface 35, it is also preferred that deicing surface 35 have a dark coating that more easily absorbs and retains heat from infrared emitters. For example, a concrete or brick floor can be painted black. The thickness of deicing surface 35 is also a variable to consider. The thicker deicing surface 35, the more mass and thus the more energy that can be stored within deicing surface 35.

Further depicted in FIG. 2 are drains 31 positioned in deicing surface 35 which collect the melted ice removed from aircraft 18. To assist in collection of the melted ice, deicing surface 35 is slightly crowned so as to slope towards drains 31. Of course, in alternative embodiments, drains 31 could be positioned beneath aircraft 18. Infrared emitters 34 can remain on after aircraft 18 has departed so as to help clean deicing surface 35 from the ice removed from aircraft 18.

In accordance with one aspect of the present invention means are also provided for causing deicing surface 35 within shelter 22 to transfer thermal energy by convection within shelter 22 to warm both exterior surface 19 of aircraft 18 and the air surrounding aircraft 18 to promote melting the ice and evaporating the melted ice on all portions of exterior surface 19 of aircraft 18. By way of example and not by limitation, depicted in FIG. 2 are a plurality of secondary infrared emitters 36 attached to interior surface 28 of shelter 22. Secondary infrared emitters 36 can be the same kind and strength of infrared emitters as discussed with primary infrared emitters 34. Furthermore, infrared emitters 36 can be selectively lowered closer to deicing surface 35 so as to increase the intensity of infrared radiation on deicing surface 35.

Although primary infrared emitters 34 and secondary infrared emitters 36 can be the same type of emitter, they serve in part different functions. Primary infrared emitters 34 are preferably a high intensity heater that is capable of quickly removing ice from a portion of aircraft 18. In contrast, secondary infrared emitters 36 are preferably orientated so as to direct uniform infrared radiation on all areas of deicing surface 35 in shelter 22 or at least to those portions not covered by aircraft 18. By so doing, deicing surface 35 becomes a giant heat sink for the energy in the infrared radiation. In turn, the thermal heat stored within deicing surface 36 is transferred by convection into shelter 22 so as to rapidly heat the air within shelter 22 and to heat all portions on exterior surface 19. Deicing surface 35 is especially useful in heating bottom surface 23 and recessed ports or joints on exterior surface 19 of aircraft 18.

As shown in FIG. 2, alternative means for causing deicing surface 35 of shelter 22 to transfer thermal energy by convection within shelter 22 comprises electrical heating elements 38 disposed within deicing surface 35. Accordingly, as heat is radiated from elements 38, the heat is absorbed by deicing surface 35 which then radiates the thermal energy into the surrounding air and onto aircraft 18.

As an additional alternative, FIG. 2 also depicts heating pipes 40 disposed and interconnected within deicing surface 35. Heated fluids such as water, steam, or oil can then be run through pipes 40, thereby heating deicing surface 35. Deicing surface 35 then radiates or transfers the thermal energy into the surrounding air and onto aircraft 18.

Using infrared emitters 34 to deice critical or heavily iced areas on aircraft 18 in conjunction with deicing surface 35 to heat the air within the shelter and all portions of exterior surface 19 of the aircraft 18 has numerous advantages. First, by heating all surfaces of aircraft 18, ice which would normally melt and then run to a location outside of the infrared radiation and then refreeze now continues to evaporate, independent of where the ice or water is located. This is especially important with regard to small ports or joints on aircraft 18 where it is difficult for infrared radiation to reach.

Second, using the combination of infrared emitters 34 and deicing surface 35 also limits the need for placing infrared emitters below aircraft 18 where, as previously discussed, they can be obstructive and potentially dangerous. This is because deicing surface 35 functions as a giant heater which through convection heats bottom surface 23 of aircraft 18. Finally, such an embodiment permits the rapid deicing of a plurality of aircraft 18 in severe weather conditions. Since much of the heating energy is stored in deicing surface 35, even if heated air is lost when doors 30 and 32 are open to exchange aircraft 18 for deicing, the air within shelter 22 is quickly heated up again to room temperature. The controlled environment provided by shelter 22 and deicing surface 35 helps facilitate rapid deicing and drying of exterior surface 19.

The design of shelter 22 and the size and configuration of infrared emitters 32, vary dramatically depending on the geographical location of the airport and the type of aircraft the airport services. For example, higher elevation airports typically have colder temperatures which result in a much thicker buildup of ice on exterior surface 19 of an aircraft 18 then lower elevation airports. Furthermore, international airports that service large aircraft, such as the Boeing 747, will require a much larger shelter 22 and corresponding number of infrared emitters than small airports where only smaller aircraft are permitted to land.

Since the size of shelter 22 and the arrangement and capacity of infrared emitters 34 vary depending on the location and type of airport 10, the exact size and configuration of infrared emitters 34 are not specifically recited. Furthermore, there are numerous configurations of the present invention that would work equally well. It is submitted, however, that the size and configuration of shelter 22, infrared emitters 34, and deicing surface 35 needed to substantially deice and dry an aircraft in a desired time can be calculated by those skilled in the art in light of the disclosure herein.

In deicing an aircraft according to the present invention, there are several general parameters that should be considered. For the deicing apparatus disclosed herein to be functional at a commercial airport, the apparatus should be able to remove ice from and substantially dry at least the exposed critical surfaces of an aircraft in a period of time that does not create undue delay to the aircraft and airport. It is also preferred that at least the critical surfaces be additionally heated to a temperature that prevents refreezing of ice on the critical surfaces prior to takeoff. This is a process known as "anti-icing."

The term "remove" as used in this specification and appended claims in relation to "ice" is synonymous with the term "deicing" and is intended to include melting the ice completely such that it runs off the aircraft as a liquid, or melting a portion of the ice contacting exterior surface 19 of aircraft 18 such that the remaining ice falls or slides off aircraft 18. The term "ice" as used in this specification and appended claims is intended to include ice in its conventional sense along with snow, frost, sleet, hail, and all other frozen contaminates which can either adhere to or buildup on aircraft 18.

Furthermore, the term "exposed critical surface" as used in the specification and appended claims is intended to include those surfaces that an aircraft manufacturer recommends be deiced prior to takeoff. The list varies for different types of aircraft. Typically, however, the list includes the leading edges, upper surfaces, and lower surfaces of the wings; the leading edges, upper surfaces, lower surfaces, and side panels of the vertical and horizontal stabilizing devices; high-lift devices such as leading-edge slats and leading or training-edge flaps; spoilers and speed brakes; all control surfaces and control balance bays; propellers; engine inlets, particle separators, and screens; windshields and other windows necessary for visibility; antennas; fuselage; exposed instrumentation devices such as angle-of-attack vanes, pitot-static pressure probes, and static ports; fuel tank and fuel cap vents; cooling and auxiliary power unit (APU) air intakes, inlets, and exhausts; and landing gear.

In the preferred embodiment, the arrangement and energy output of infrared emitters 34 and deicing surface 35 should be sufficient to remove the ice and substantially dry exterior surface 19 of aircraft 18 in a period of time less than 15 minutes, less than 10 minutes being preferred, and less than 5 minutes being most preferred. The time is measured from when aircraft 18 is enclosed within shelter 22. Such a period of time permits sufficient time for the previous aircraft to takeoff and be clear of airport 10 and yet not create an undue delay for subsequent aircraft.

To remove the ice and dry exterior surface 19 of aircraft 18 in the desired period of time, several variables should be considered. The primary variables of the present invention include, the distance the infrared emitters are away from the intended object of heating, the density of the infrared radiation on the object the infrared radiation is hitting, the thickness of the ice on the aircraft, and the environment in which the aircraft is being deiced.

The distance the infrared emitters are away from aircraft 18 and/or deicing surface 35 and the density of the infrared radiation are in part related. That is, the farther an infrared emitter is away from an object, the more disperse the infrared radiation and thus the lower the density of the infrared radiation on the object. However, the density can be compensated for by increasing the number and/or strength of the infrared emitters. Since the number, the strength, and the distance of the infrared emitters are interrelated variables, the optimization of such variables is dependent on cost and time.

The thickness of the ice also affects the duration of time in which aircraft 18 can be deiced and dried. The infrared radiation not only heats the ice but also penetrates through the ice to start heating exterior surface 19 of aircraft 18. It is preferred that exterior surface 19 be sufficiently heated so as to create a boundary layer of melted ice between exterior surface 19 and the ice so that the ice slips off exterior surface 19 without having to melt all the ice.

The thicker the ice the longer it takes to remove the ice under set conditions. To work under all conditions, it is thus preferred that the deicing apparatus be designed to function within a required time limit under the most severe conditions. It is envisioned that the present system will be able to deice and dry an aircraft having an average thickness of ice ranging from a skiff of ice to several decimeters of ice.

One of the more important variables is the environment in which aircraft 18 is being deiced. Even when extremely high densities of infrared radiation are applied to aircraft 18, if aircraft 18 is subject to high winds and cold temperatures, aircraft 18 will not deice or at least not deice in the desired time, Accordingly, to deice and dry aircraft 18 in the desired time it is necessary to deice aircraft 18 in a controlled environment.

As previously discussed, this is accomplished by placing aircraft 18 in shelter 22 and by heating the air therein. Preferably deicing surface 35 is able to heat the air within the room to a temperature in a range between about 1° C. to about 30° C., with about 10° C. to about 30° C. being preferred, and about 20° C. to about 30° C. being most preferred.

In an alternative embodiment, it is also envisioned that forced air or alternative heating embodiments can be used to assist in heating and controlling the environment within the shelter 22.

The present invention is further disclosed by the preferred method in which the deicing mechanism operates. In the preferred embodiment, the environment within shelter 22 is heated prior to positioning aircraft 18 within shelter 22. This is accomplished by heating deicing surface 35 by the methods disclosed herein. Furthermore, primary infrared emitters 34 can be used to further assist in heating deicing surface 35.

Once the environment within shelter 22 is heated to about room temperature, doors 30 are opened allowing aircraft 18 to be driven or pulled within shelter 22. In conditions where snow has previously built up on wings 27 of aircraft 18, it may be beneficial to initially sweep or blow off excess snow buildup from wings 27 prior to placing aircraft 18 within shelter 22. Once aircraft 18 is positioned within shelter 22, doors 30 are closed and primary emitters 34 are turned on so as to direct infrared radiation onto a portion of exterior surface 19. Preferably, such surfaces are top surfaces 21 of aircraft 18 where snow and ice buildup is the heaviest.

A combination of the heat from deicing surface 35 and infrared deicers 34 remove the ice either by melting it or causing it to slip from aircraft 18. Once the ice is removed, the applied heat and infrared radiation continues to substantially dry all portions of exterior surface 19 of aircraft 18. In one embodiment, automatic hot air blowers can be aligned with aircraft 18 to blow hot air over exterior surface 19. The hot air serves both to dry exterior surface 19 and to help remove liquid and/or ice that may have settled in cavities or various recesses on exterior surface 19. Alternatively or in addition, individuals can go around with hand blowers for assisting in deicing critical areas and blowing water out of navigational ports and other recesses.

Once the aircraft is sufficiently dried and heated to a point that it will not re-ice prior to takeoff, door 32 is opened allowing aircraft 18 to depart. Once aircraft 18 has departed, door 32 is closed and door 30 is again opened to allow the next aircraft 18 in. Although not necessary, it is preferred that doors 30 and 32 are not simultaneously opened so as to help maintain the heated air and temperature within shelter 22.

As depicted in FIG. 1, a plurality of shelters 50 can be positioned near the end of runway 12. In this embodiment, aircraft 18 can simultaneously be deicing so as to decrease any delay caused by deicing. It is further preferred that shelter 22 be positioned as close to runway 12 on taxiway 14 as safety will permit. Such positioning limits the exposure of aircraft 18 to the ambient conditions after deicing, thereby limiting the possibility of reicing prior to takeoff.

Also shown in FIG. 1, an elongated shelter 52 can be provided in which a plurality of aircraft 18 can simultaneously be positioned and deiced within. Shelter 52 thus also decreases the delay caused by deicing.

In alternative embodiments, shelter 22 can be positioned anywhere on taxiway 14. Furthermore, shelter 22 can be positioned at loading area 16 to deice aircraft 18 during boarding and disembarking of the passengers. Of course, any position of shelter 22 must take into consideration the hazards of airline traffic and be in conformance with all Federal Aviation Administration regulations.

EXAMPLE

As previously discussed, the size of a shelter and deicing surface and the number and positioning of infrared emitters is dependent on a number of variables which are site specific. Nevertheless, FIG. 3 is a top view depicting an arrangement of infrared emitters in one working embodiment of the present invention. The embodiment in the present example is capable of deicing and substantially drying the exterior surface of a Boeing 727 in most winter conditions in less than about 15 minutes.

By way of example, shelter 22 is defined as having a length of about 65 m, a width of about 65 m, and a height of about 15 m. The walls and ceiling are insulted to factor of about R-30. Deicing surface 35 spans the length between walls 24. The deicing surface is made of concrete and painted black. Doors 20 and 32 are attached at opposing sides of the shelter.

Attached to the ceiling so as to cover the length of the fuselage 25 and the width of the wing span are 110 equally spaced 7.3 KW quartz lamp infrared emitters 42. Quartz lamp infrared emitters 42 can selectively be lowered so as to be placed about 3 m from the exterior surface of aircraft 18.

Evenly distributed and attached to the four corners of the ceiling not directly over aircraft 18 are 30/ea. 200,000 BTU/H gas infrared tube heaters 44. The tube heaters are raised to approximately 13 m off the floor and are directed so as to radiate over all portions of the deicing surface not obstructed by aircraft 18.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. An apparatus for rapidly deicing and substantially drying the exterior surface of an aircraft on an approach area awaiting to takeoff, the apparatus comprising:
   (a) a shelter capable of enclosing an aircraft therein;
   (b) a deicing surface positioned within the shelter such that the aircraft rests thereon;
   (c) means for emitting infrared radiation on a portion of the exterior surface of the aircraft enclosed within the shelter to melt the ice on that portion of the exterior surface; and
   (d) means for causing the deicing surface within the shelter to transfer thermal energy by convection within the shelter to warm both the exterior surface of the aircraft and the air surrounding the aircraft to promote melting the ice and evaporating the melted ice on all portions of the exterior surface of the aircraft, the combination of the infrared radiation and the thermal energy substantially deicing and drying all portions of the exterior surface of the aircraft.

2. An apparatus as defined in claim 1, wherein the shelter has a plurality of walls, a roof spanning the walls, and doors positioned on opposing sides of the shelter.

3. An apparatus as defined in claim 1, wherein the shelter is insulated to an R-factor in a range between about 10 to about 40.

4. An apparatus as defined in claim 1, wherein the deicing surface is made of concrete.

5. An apparatus as defined in claim 1, wherein the deicing surface has a dark coating.

6. An apparatus as defined in claim 1, wherein the means for emitting infrared radiation comprises a plurality of quartz lamp infrared emitters.

7. An apparatus as defined in claim 1, wherein the means for causing the deicing surface within the shelter to transfer thermal energy by convection within the shelter comprises a plurality of infrared emitters directing infrared radiation onto the deicing surface.

8. An apparatus as defined in claim 1, wherein the means for causing the deicing surface within the shelter to transfer thermal energy by convection within the shelter comprises electrical filaments positioned within the deicing surface.

9. An apparatus as defined in claim 1, wherein the means for causing the deicing surface within the shelter to transfer thermal energy by convection within the shelter comprises interconnected pipes dispersed throughout the deicing surface through which heated liquids and gasses can pass through for heating the deicing surface.

10. An apparatus as defined in claim 1, wherein the combination of the infrared radiation and the thermal energy substantially deice and dry all portions of the exterior surface of the aircraft in a period of time less than about 15 minutes from when the aircraft is positioned within the shelter.

11. An apparatus as defined in claim 1, wherein the combination of the infrared radiation and the thermal energy substantially deice and dry all portions of the exterior surface of the aircraft in a period of time less than about 10 minutes from when the aircraft is positioned within the shelter.

12. An apparatus as defined in claim 1, wherein the shelter is capable of enclosing plurality of aircraft simultaneously.

13. An apparatus as defined in claim 1, wherein the deicing surface comprises a drain through which the melted ice is removed from the shelter.

14. An apparatus for deicing an aircraft prior to takeoff, the aircraft having an exterior surface with ice deposited thereon, the apparatus comprising:
  (a) a shelter being a size capable of enclosing an aircraft, the shelter having walls, a roof, an interior surface, and doors positioned on opposing sides of the shelter for receiving and removing the aircraft;
  (b) a deicing surface positioned within the shelter such that the aircraft rests thereon;
  (c) a plurality of primary infrared lamps attached to the interior surface of the shelter and oriented so as to direct infrared radiation on a portion of the exterior surface of the aircraft enclosed within the shelter to melt the ice on that portion of the exterior surface; and
  (d) a plurality of secondary infrared lamps attached to the interior surface of the shelter and oriented so as to direct infrared radiation on the deicing surface to heat the deicing surface, in turn the deicing surface warming both the air surrounding the aircraft and the exterior surface of the aircraft to promote melting the ice and evaporating the melted ice on all portions of the exterior surface of the aircraft, the combination of the primary infrared radiation and the secondary infrared radiation substantially deicing and drying all portions of the exterior surface of the aircraft.

15. A method for rapidly deicing and substantially drying the exterior surface of an aircraft on an approach area awaiting to takeoff, the method comprising the steps of:
  (a) enclosing an aircraft within a shelter on an approach area, the aircraft resting on a deicing surface positioned within the shelter;
  (b) applying infrared radiation to a portion of the exterior surface of the aircraft enclosed within the shelter to melt the ice on that portion of the exterior surface; and
  (c) heating the deicing surface within the shelter to transfer thermal energy by convection within the shelter to warm both the exterior surface of the aircraft and the air surrounding the aircraft to promote melting the ice and evaporating the melted ice on all portions of the exterior surface of the aircraft, the combination of the infrared radiation and the thermal energy substantially deicing and drying all portions of the exterior surface of the aircraft.

16. A method as recited in claim 15, wherein the method further includes heating the deicing surface prior to enclosing the aircraft.

17. A method as recited in claim 15, wherein the method further comprises blowing hot air on the exterior surface of the aircraft to assisting in removing the ice and evaporating the melted water on the exterior surface.

18. A method as recited in claim 15, wherein the method further comprises positioning a plurality of shelters near the end of a runway for simultaneously deicing a plurality of aircraft.

19. A method as recited in claim 15, wherein the deicing and drying of all portions of the exterior surface of the aircraft is accomplished within 15 minutes after the aircraft being enclosed within the shelter.

20. A method as recited in claim 15 wherein the method further comprises leaving the aircraft within the shelter until the exterior surface of the aircraft is sufficiently warm to prevent the formation of ice on the exterior surface prior to takeoff of the aircraft.

21. A method for consecutively deicing and substantially drying a plurality of aircraft on an approach area, the method comprising the steps of:
  (a) heating a deicing surface positioned within a shelter, the shelter being positioned on an approach area, the deicing surface being heated so as to heat the air within the shelter to above freezing;
  (b) enclosing the aircraft within the shelter so as to rest on the deicing surface;
  (c) applying infrared radiation to a portion of the exterior surface of the aircraft enclosed within the shelter to melt the ice on that portion of the exterior surface; the infrared radiation applied to the aircraft and the heat from the deicing surface substantially deicing and drying the exterior surface of the aircraft;
  (d) replacing the aircraft positioned within the shelter with a consecutive aircraft having an exterior surface with ice deposited thereon; and
  (e) applying infrared radiation to a portion of the exterior surface of the consecutive aircraft enclosed within the shelter, the infrared radiation applied to the consecutive aircraft and the heat from the deicing surface substantially deicing and drying the exterior surface of the aircraft.

* * * * *